(12) United States Patent
Crepp (10) Patent No.: US 12,140,493 B2
(45) Date of Patent: Nov. 12, 2024

(54) WAVE FRONT SENSOR FOR WAVE ABERRATION COMPENSATION IN AN OPTICAL SYSTEM

(71) Applicant: UNIVERSITY OF NOTRE DAME DU LAC, South Bend, IN (US)

(72) Inventor: Justin Crepp, Granger, IN (US)

(73) Assignees: University of Notre Dame du Lac, South Bend, IN (US); Northrop Grumman Systems Corporation, Falls Church, VA (US)

( * ) Notice: Subject to any disclaimer, the term of this patent is extended or adjusted under 35 U.S.C. 154(b) by 293 days.

(21) Appl. No.: 17/628,454

(22) PCT Filed: Jul. 17, 2020

(86) PCT No.: PCT/US2020/042576
§ 371 (c)(1),
(2) Date: Jan. 19, 2022

(87) PCT Pub. No.: WO2021/016096
PCT Pub. Date: Jan. 28, 2021

(65) Prior Publication Data
US 2022/0260453 A1    Aug. 18, 2022

Related U.S. Application Data

(60) Provisional application No. 62/876,157, filed on Jul. 19, 2019.

(51) Int. Cl.
*G01M 11/02*    (2006.01)
*G02B 27/28*    (2006.01)

(52) U.S. Cl.
CPC .... *G01M 11/0271* (2013.01); *G01M 11/0257* (2013.01); *G02B 27/283* (2013.01)

(58) Field of Classification Search
CPC .......... G01M 11/0271; G01M 11/0257; G02B 27/283
See application file for complete search history.

(56) References Cited

U.S. PATENT DOCUMENTS

| 3,835,469 A | 9/1974 | Chen et al. |
| 4,825,216 A | 4/1989 | Dufort |
| (Continued) | | |

FOREIGN PATENT DOCUMENTS

| CN | 102680117 A | 9/2012 |
| CN | 203298878 U | 11/2013 |
| (Continued) | | |

OTHER PUBLICATIONS

Bharmal, "Static optical designs for Wavefront Curvature Sensing," Inst. Phys. Pub. and SISSA, Jun. 9, 2006, 13 pages.
(Continued)

*Primary Examiner* — Dominic J Bologna
(74) *Attorney, Agent, or Firm* — Greenberg Traurig LLP (57) ABSTRACT

An optical system includes an incident beam divider structured to divide an incident beam into multiple derivative beams having varying polarizations. The optical system further includes a beam splitter structured to reflect and transmit the multiple derivative beams into different optical paths that have varying lengths. In the different optical paths, the multiple derivative beams experience reflection on one or more mirrors associated with each optical path. The one or more mirrors direct the multiple derivative beams back to the beam splitter, where the multiple derivative beams are then directed to a common detector. The common detector generates images of the multiple derivative beams, and a computing device analyzes the generated images to determine an error present in the images associated with the incident beam.

20 Claims, 6 Drawing Sheets

(56) References Cited

U.S. PATENT DOCUMENTS

| | | |
|---|---|---|
| 5,003,314 A | 3/1991 | Berkowitz et al. |
| 6,075,497 A | 6/2000 | Chen et al. |
| 6,304,330 B1 | 10/2001 | Millerd et al. |
| 6,721,510 B2 | 4/2004 | Graves et al. |
| 6,819,434 B2 | 11/2004 | Hill |
| 6,958,805 B2 | 10/2005 | Kim |
| 6,977,622 B2 | 12/2005 | Hay et al. |
| 7,170,611 B2 | 1/2007 | Millerd et al. |
| 7,402,785 B2 | 7/2008 | Barchers |
| 7,428,093 B2 | 9/2008 | Tegreene et al. |
| 7,633,053 B2 | 12/2009 | Wollenschensky et al. |
| 8,092,021 B1 | 1/2012 | Northcott et al. |
| 8,576,132 B2 | 11/2013 | Lier |
| 8,591,027 B2 | 11/2013 | Su et al. |
| 8,655,192 B2 | 2/2014 | Osawa et al. |
| 9,140,537 B2 | 9/2015 | De Groot et al. |
| 9,417,610 B1 | 8/2016 | Kim |
| 9,490,280 B2 | 11/2016 | Sertel et al. |
| 2002/0047992 A1 | 4/2002 | Graves et al. |
| 2003/0230710 A1* | 12/2003 | Wolleschensky ...... G02B 26/06 250/234 |
| 2011/0249976 A1* | 10/2011 | Osawa ................ G02B 27/283 359/489.08 |
| 2012/0008951 A1 | 1/2012 | Mikami |
| 2015/0043005 A1* | 2/2015 | de Groot ............. G03F 7/70775 356/487 |
| 2016/0209646 A1* | 7/2016 | Hattori .................. G02B 21/02 |
| 2018/0183152 A1 | 6/2018 | Turpin et al. |
| 2020/0069177 A1 | 3/2020 | Kim |
| 2020/0119811 A1 | 4/2020 | Kay et al. |
| 2020/0144719 A1 | 5/2020 | Scarborough et al. |

FOREIGN PATENT DOCUMENTS

| | | |
|---|---|---|
| CN | 102680117 B | 1/2015 |
| WO | 2019010507 A1 | 1/2019 |

OTHER PUBLICATIONS

Crass et al., "The AOLI low-order non-linear curvature wavefront sensor: a method for high sensitivity wavefront reconstruction," Institute of Astronomy, Univ. of Cambridge, 10 pages.

Guyon, "High Sensitivity Wavefront Sensing with a Nonlinear Curvature Wavefront Sensor," Pub. The Astron. Soc. Pacific, 122:49-62, Jan. 2010, 14 pages.

International Search Report and Written Opinion, application No. PCT/US20/42576, mailed Oct. 13, 2020, 16 pp.

Mateen, "Development and Verification of the Non-Linear Curvature Wavefront Sensor," Dissertation, 2015, 130 pages.

* cited by examiner

WAVE FRONT SENSOR FOR WAVE ABERRATION COMPENSATION IN AN OPTICAL SYSTEM

CROSS REFERENCE TO RELATED APPLICATION

This application is a National Stage filing under 35 U.S.C. § 371 of PCT Application No. PCT/US2020/042576, filed on Jul. 17, 2020, which itself claims priority to U.S. Provisional Patent Application No. 62/876,157, filed on Jul. 19, 2019, the disclosures of which are each incorporated by reference herein in their entireties.

BACKGROUND

Wave front sensors are often used to sense and compensate for wave-front distortions in optical systems such as telescopes. When light propagates through a turbulent medium, differences in the index of refractions through which the light travels cause wave-front aberrations that degrade the quality of recorded images. Adaptive optics (AO) systems have been used to sense and compensate for such wave-front distortions. When properties of the turbulent medium change on short timescales, such as with wind patterns that transport aberrations caused by temperature and pressure changes in Earth's atmosphere, the phase and amplitude of the complex wave must be measured rapidly using sensitive equipment.

Wave front sensors are used to measure wave-front distortions so that the image captured by the optical system may be modified accordingly to compensate for any aberrations. The resulting image quality may improve dramatically compared to uncompensated beams provided the spatial and temporal scales are matched to changes in the turbulent medium. The performance and delivered image quality of any AO system is thus ultimately governed by that of its wave front sensor (sensitivity, speed, accuracy, etc.).

SUMMARY

In an example, a method of detecting wave front aberrations in an optical system includes dividing an incident beam of an incoming optical wave into derivative beams having varying polarizations. The method further includes controlling optical path lengths amongst the derivative beams to have varied distances, such that each of the optical path lengths corresponds to a different sampling plane along the direction of propagation of the incident beam. The method further includes directing the derivative beams to a common detector. The method further includes generating, by the common detector, images of the derivative beams.

In a further example method of detecting wave front aberrations in an optical system, a method includes dividing an incident beam of an incoming optical wave into four derivative beams.

In an example, an optical system includes an incident beam divider structured to divide an incident beam into derivative beams having varying polarizations. The optical system further includes a beam splitter structured to reflect a first derivative beam of the derivative beams into a first optical path and transmit a second derivative beam of the derivative beams into a second optical path, the first optical path having a different path length than the second optical path. The optical system further includes a first mirror structured to reflect the first derivative beam back to the beam splitter, whereupon the beam splitter is further structured to transmit the first derivative beam to a common detector. The optical system further includes a second mirror structured to reflect the second derivative beam back to the beam splitter, whereupon the beam splitter is further structured to reflect the second derivative beam to the common detector.

In a further example optical system, an incident beam divider is structured to divide the incident beam into four derivative beams.

DETAILED DESCRIPTION

Disclosed herein are examples for an improved wave front sensor and methods of use thereof for measuring and compensating for wave front aberrations in an optical system. In particular, aberrations in at least one of phase or amplitude of an input beam may be detected by directing multiple beams derived from the input beam simultaneously to a common detector. In some embodiments, in addition to directing the multiple beams derived from the input simultaneously to the common detector, the multiple beams may also be spatially displaced, such that the multiple beams and the images derived by the common detector therefrom do not overlap or interfere with one another. For example, four beams may be derived from the input beam and directed to the common detector in a spatially displaced configuration. However, in some embodiments, one or more of the beams may not be spatially displaced from one another, and additional processing may be performed based on the output of the detector to determine characteristics of the beams even if they are not spatially displaced.

Light propagating through a turbulent medium (e.g., an atmosphere) may encounter differences in the local index of refraction. These differences tend to produce a phenomenon known as wave front aberration that may degrade the quality of images based on the propagated light. Various known optical systems have been used throughout the years to sense and attempt to compensate for such wave front distortions. Where properties of the turbulent medium, such as atmospheric gases, change on short time scales, for instance as a result of temperature and pressure changes in Earth's atmosphere, the phase and amplitude of the propagating light wave may be measured using certain types of equipment, and images produced that compensate for the aberrations.

In a typical wave front sensing and compensation system, a tip/tilt mirror, deformable mirror, spatial light modulator, and/or other equipment may be used to modify optical properties of a beam. Resulting image quality may be improved, in metrics such as peak intensity, full-width half-maximum, spatial resolution, Strehl ratio, encircled energy, and others, compared to uncompensated beams at least where spatial and temporal scales are matched to changes in the turbulent medium. Poor sampling, inefficiencies, limited dynamic range, signal noise, and environmental effects may impact the fidelity of wave front aberration estimates and compensation.

Wave front sensors may be used in the field of adaptive optics, having applications to astronomy, microscopy, industrial fields, communications, and medical science, among other areas. Commercially available devices trade sensitivity for dynamic range, speed, ease of use, and susceptibility to systematic errors. For example, in a Shack-Hartmann sensor, an array of lenslets is used to create multiple focused points of light. Deviations from an expected center point for each lenslet are measured to determine the shape of the incident wave front. However, because the Shack-Hartmann relies on geometric optics for the reconstruction process, and not the wave nature of light, it's performance is several orders of magnitude worse than that of the photon-noise limit. As a consequence, while the Shack-Hartmann wave front sensor is capable of sensing low spatial frequency aberrations, it is not particularly sensitive compared to certain other designs.

The usage of lenslets also causes systematic errors when performing adaptive optics measurements in the presence of deep turbulence and scintillation. Near-field diffraction effects, that convert phase aberrations into amplitude aberrations (and vice-versa), create local signal fade within portions of the propagating beam. The Shack-Hartmann sensor struggles to interpret regions in which destructive interference causes the intensity of spots focused by the lenslets to diminish. The entire reconstruction process may be jeopardized should the intensity within a fraction of the lenslets disappear entirely.

A sensor that measures the changing interference pattern produced by a coherent beam along the axis of propagation takes advantage of the wave nature of light. Measuring fringe patterns makes sensing the oscillatory nature of waves possible. For example, one approach to reconstructing the phase and amplitude of a complex wave is to record multiple, out-of-focus (purposefully defocused) images simultaneously.

Multiple, out-of-focus images may be placed onto separate cameras, however a wave front sensor that uses multiple individual cameras has practical disadvantages, such as greater size, weight, power, and cost. Usage of multiple high-speed cameras, each having distinct noise characteristics and timing properties, also creates problems with real-time applications. Coordinating the arrival of high-speed data (many kilo-Hertz) from multiple electronic devices can lead to differential latency issues with signals becoming out of step with one another.

Placing multiple defocused pupil images onto a single detector plane using a series of fold mirrors may avoid the use of multiple high-speed cameras. However, such an approach may have an unnecessarily complex optical design with numerous surface reflections, non-common-path errors, and lower throughput. Furthermore, such an approach may preclude real-time optimization of sensitivity to certain spatial frequencies of interest, such as those that dominate the power spectrum of aberrations experienced by the adaptive optics system.

Figure 1:
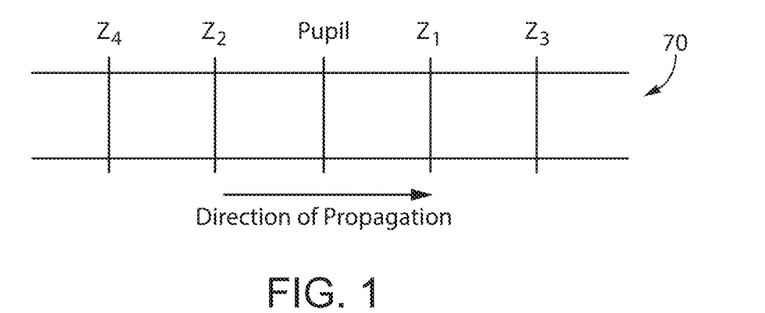
FIG. 1 is a diagram illustrating beam direction, re-imaged pupil location, and sampling plane locations along an optical axis where intensity measurements are made according to various examples.

Referring to FIG. 1, there is shown a diagram 70 illustrating beam direction, pupil location, and sampling plane locations ($Z_1$, $Z_2$, $Z_3$, and $Z_4$) for a near-field diffraction sensor. Such a device attempts to estimate the aberrations present at the pupil plane based on intensity measurements associated with various other sampling plane locations. Disclosed herein are various methods and systems for varying the location of the sampling planes while simultaneously placing all defocused images onto the same detector.

As described herein, one way to detect defocused images from different sampling plane locations (e.g., sampling plane locations $Z_1$, $Z_2$, $Z_3$, and $Z_4$ as show in FIG. 1) is to receive an input beam (also referred to herein as an incident beam), split that beam into different beams (also referred to herein as derivative beams), and cause those beams to travel different optical path lengths before being detected. Those optical path lengths may be configured or controlled such that, after traveling the varying optical path lengths, images of the derivative beams represent defocused images associated with the different sampling plane locations.

Figure 2:
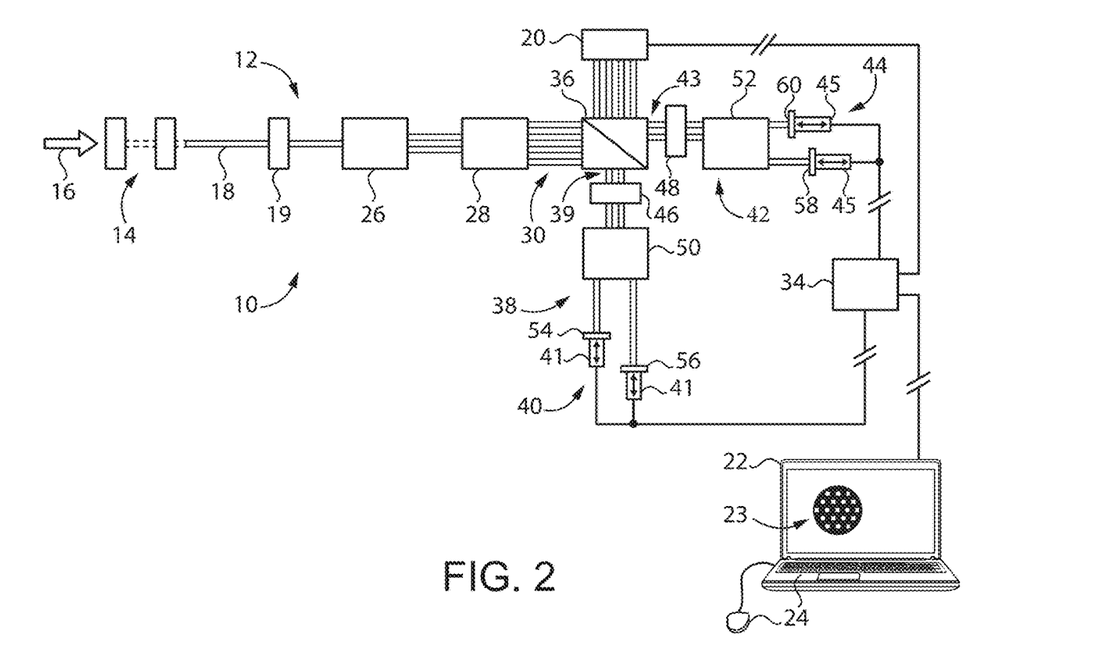
FIG. 2 is a schematic diagram of an example wave front sensor according to various examples.

Accordingly, the optical path lengths associated with derivative beams of a wave front sensor may each correspond to a different sampling plane (e.g., sampling plane locations $Z_1$, $Z_2$, $Z_3$, and $Z_4$) along an optical axis or direction of propagation of an incident beam. In other words, images generated by a detector based on the derivative beams that have travelled different optical path lengths are associated with the different sampling plane locations. Those images may be used as disclosed herein to estimate errors or aberrations present in an optical beam at the re-imaged pupil. Thus, due to the differing path lengths of the beams passed through the wave front sensor(s) disclosed herein (e.g., as shown in FIG. 2), defocused beam images simultaneously presented to a common detector correspond to cross sections of the incident beam at the respective sampling planes. The uncompensated beam images may then be analyzed, in real time, to sense the complex wave and produce a compensated image.

Accordingly, disclosed herein are improved methods and systems for a wave front sensor that may direct multiple, spatially displaced images onto a single camera or detector simultaneously.

FIG. 2 is a schematic diagram of an example wave front sensor according to various examples. The wave front sensor of FIG. 2 includes an optical system 10 with incoming optics 12 in the nature of an incoming optical train. Incoming optics 12 may include fore optics 14 such as mirrors, lenses, or combinations of these, structured to magnify or demagnify and receive an incoming optical wave 16 propagated through a medium. The fore optics 14 may also be or include one or more filters, such as a wavelength filter that controls the wavelength(s) of light that are permitted to enter the optical system 10. Furthermore, the fore optics 14 may be components of a telescope, microscope, or other imaging system, for example. The incoming optical wave 16 may be propagated through a medium such as atmospheric gases of the Earth's atmosphere, a liquid medium, or still another fluid medium subject to turbulence that may produce aberrations by way of variations in local index of refraction that will be familiar to those of ordinary skill in the art.

In one practical implementation, the optical system 10 is deployed for wave front sensing and aberration compensation in a telescope. In another implementation, the optical system 10 is deployed in a medical diagnostic system such as for characterizing surface retinal features in a patient's eye. In still other implementations, the optical system 10 may be used in an industrial application for characterization of surfaces, or in a wide variety of still other environments. The incoming optical wave 16 may include a beam of coherent or partially coherent radiation. The incoming optical wave 16 may be reflected from a surface, or collected from a self-luminous remote source, and subsequently conditioned using the fore optics 14. The fore optics 14 produce an incident beam 18, which may be a beam of coherent light, which may be formatted by way of the optical system 10 so that phase and/or amplitude aberrations may be detected and compensated to produce a corrected image, for real time or substantially real time viewing by a user, or recording and storage for later retrieval and analysis.

In other words, the optical system 10 may be used to determine the level of distortion or blurring to images captured by an imaging system. For example, a wave front sensor as disclosed herein may be used to measure the distortion or blurring of an image captured and generate a deformation waveform that may be used to correct or otherwise modify the image captured at the pupil. A computing device as disclosed herein may be used to generate an opposite waveform as compared to the measured deformation waveform, and that opposite waveform may be used to control a device, such as a deformable mirror, that may be used to correct an image. For example, a deformable mirror may be used to direct the incoming optical wave 16 to a user or electronic device for display, recording, storage, etc. In other words, the incoming light may be purposefully distorted to cancel out the deformation caused by the wave front as measured by the wave front sensor.

Figure 4:
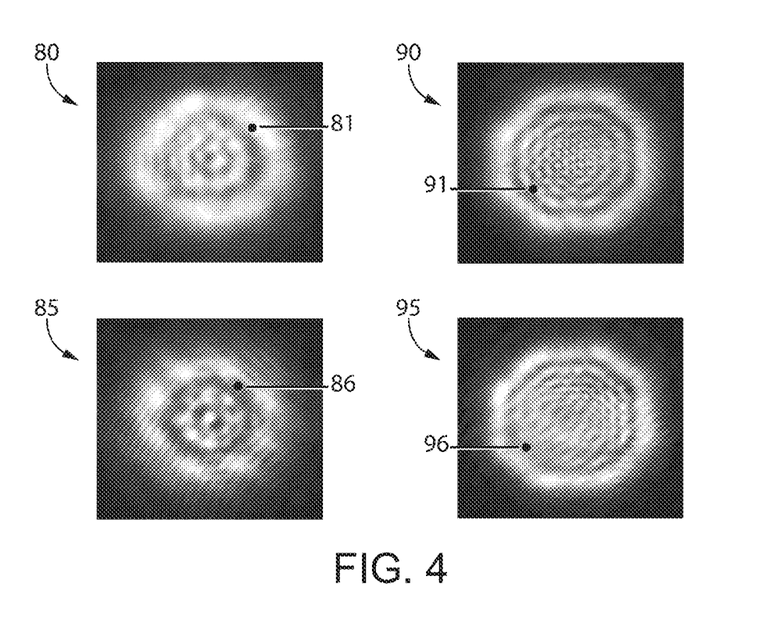
FIG. 4 is a comparative view of images determined from derivative beams by a common detector according to various examples.

The optical system 10 also includes a detector 20 such as a CCD camera or comparable device. The detector 20 may be in communication with a display 22 and an electronic control unit 34. The display 22 may show a compensated image 23 that might be viewed by a user, as well as input devices 24 that may be used to manipulate certain parameters of the optical system 10 as further discussed herein. In some examples, the display 22 may show images derived from the derivative beams used to correct an image for viewing by the user (e.g., as shown in FIG. 4). An electronic control unit 34 may receive image information from the detector 20, process the image information so as to determine an error in at least one of phase or amplitude of the incident beam 18, and exploit the determined error to produce a compensated image 23. As will be further discussed herein, electronic control unit 34 may analyze intensity information of each of a plurality of derivative beams detected by way of the detector 20, and determine the error based upon the analysis of the image intensity information. As also further discussed herein, the detector 20 may include a common detector that simultaneously receives a plurality of formatted derivative beams based upon the incident beam 18, such that each corresponds to a different sampling plane along an optical axis or direction of propagation of the incident beam 18.

The electronic control unit 34 may include any suitable central processing unit, and may be resident on a laptop, desktop computer, or real-time computer that also includes the display 22, or provided as, or as a component of, a separate, standalone controller. The electronic control unit 34 might include a microprocessor, a microcontroller, embedded system, graphics processing units (GPU), a field programmable gate array (FPGA), or still another.

The electronic control unit 34 may also include a machine-readable memory, such as RAM, ROM, SDRAM, DRAM, EEPROMM, a hard drive, FLASH, or still another. The memory on the electronic control unit 34 may store computer-executable program instructions for the operating optical system 10, and also store image information and image intensity information, at least temporarily, that is used in producing the compensated image 23 as further discussed herein.

Some or all of the components of the optical system 10 may be mounted rigidly to maintain alignment amongst the various components. The optical system 10, or parts thereof, may also be mounted within a housing (not shown) that is or includes a light-tight box to reduce external stray light, and potentially including internal baffling or other features for occulting internal stray light caused by optical scattering. The electronic control unit 34, the display 22, and/or the input devices 24 may additionally or alternatively be the computing device illustrated in FIG. 7, or may additionally or alternatively include one or more components of the computing device illustrated in FIG. 7.

In FIG. 2, the incident beam 18 is conveyed from the fore optics 14 to a polarization element 19. The incident beam 18 may be controlled by way of the fore optics 14 to determine the diameter of the incident beam 18 and system magnification. A pupil location may be defined based upon the fore optics 14, aperture stop, and/or any other optical elements. Polarization element 19 may include a wave plate, such as a quarter wave plate (QWP), or another polarization-sensitive element such as a Faraday rotator, a half wave plate, or still another, which may be mounted onto a rotation stage or the like to actively control an input polarization state of light transmitted through the optical system 10 for formatting and wave front aberration sensing. Linearly polarized light would be converted to circularly polarized light where polarization element 19 is a QWP, for example.

A first incident beam divider or displacer 26 receives light polarized by the polarization element 19, and divides the incident beam into two derivative beams. In an example, the first beam displacer 26 outputs a first beam that is a near-duplicate of the incident beam 18 and a second beam that is a near duplicate of the incident beam 18. For example, the second beam may be spatially displaced from the first beam as shown in FIG. 2, and may have a different (e.g., orthogonal) polarization state as compared to the incident beam 18 and the first beam. A second beam displacer 28 divides the two derivative beams output by the first beam displacer 26 into four derivative beams. Like the first beam displacer 26, the second beam displacer 28 may also be configured to produce two derivative beams for each input beam, where one is a near-duplicate of the input and the second is the similar but for a different (e.g., orthogonal) polarization. Thus, in the example of FIG. 2, four beams derivative of the incident beam 18 are ultimately output by the beam displacer 28, where two of the beams are nearly identical to the incident beam 18 and the other two beams are similar to the incident beam 18 while having different (e.g., orthogonal) polarization as compared to the incident beam 18. It should be appreciated that a different number of derivative beams 30 might be provided using different configurations of beam displacers, splitters, etc., but the example of FIG. 2 provides for at least four derivative beams. Each of the two derivative beams, and then four derivative beams produced by the beam displacers 26 and 28, respectively, may be derived to have roughly equal energies and may each be spatially displaced from one another as shown in FIG. 2. However, in other embodiments, the beams may not be spatially displaced and/or may have different energies.

The optical system 10 further includes a beam splitter 36 structured to transmit a fraction of the incoming derivative beams 30 and reflect a fraction of the incoming derivative beams 30. In particular, the beam splitter 36 may be a polarizing beam splitter (PBS) and therefore may reflect beams of a first polarization and transmit beams of a second polarization. For example, the reflected beams may have an orthogonal polarization to the transmitted beams. Thus, since two of the derivative beams 30 have a first polarization and two of the derivative beams 30 have a second polarization after passing through the first and second beam displacers 26 and 28, the beam splitter 36 may reflect two derivative beams 39 to a first optical formatting arm 38. Similarly, the beam splitter 36 may transmit two derivative beams 43 to a second optical formatting arm 42. Thus, the first optical formatting arm 38 is arranged to receive the reflected derivative beams 39 from the beam splitter 36 and the second optical formatting arm 42 is arranged to receive the transmitted derivative beams 43 from the beam splitter 36. In this way, the derivative beams 30 may be directed to different optical paths that may have different characteristics (e.g., optical path length) as further disclosed herein. In various examples, other components than the beam displacers 26, 28 and the beam splitter 36 may be used to split an incident beam and direct the beams to different optical paths. For example, Wollaston prisms or other devices may be used instead of or in addition to beam displacers and/or splitters.

The first optical formatting arm 38 includes an optical path length setting mechanism 40 structured to vary optical path lengths amongst the reflected derivative beams 39. The second optical formatting arm 42 includes an optical path length setting mechanism 44 structured to vary optical path lengths amongst the transmitted derivative beams 43. The optical path length setting mechanisms 40 and 44 may be structured to vary the respective optical path lengths, such that optical path lengths of each of the reflected derivative beams 39 may differ from each other and/or from optical path lengths of the transmitted derivative beams 43. In other words, each of the four derivative beams in FIG. 2 may have a different optical path length owing to the optical path length setting mechanisms 40 and 44, which may be, for example, translatable mirrors as disclosed herein. In various embodiments, the optical path length setting mechanisms 40 and 44 may be or may include retroreflectors, curved mirrors, deformable mirrors, or may be any other type of mirror or reflective device.

The first optical formatting arm 38 may further include mirror elements 54 and 56 arranged to redirect the reflected derivative beams 39 received from a first polarization element 46 back through first polarization element 46 to beam splitter 36. Second optical formatting arm 42 includes mirror elements 58 and 60 arranged to redirect transmitted derivative beams 43 received from a second polarization element 48 back through second polarization element 48 to beam splitter 36. A first optical relay is shown at 50 within first optical formatting arm 38, and a second optical relay is shown at 52 within second optical formatting arm 42. In various embodiments, the different paths for each beam may have separate components. For example, each of the reflected derivative beams 39 may be associated with its own optical relay components and/or polarization element(s). Similarly, the paths for the transmitted derivative beams 43 may be associated with their own optical relay components and/or polarization element(s).

It will be recalled that each of first optical formatting arm 38 and second optical formatting arm 42 includes an optical path length setting mechanism 40 and 44, respectively. Mirror elements 54, 56 and 58, 60 may be coupled with the optical path length setting mechanisms 40 and 44, respectively, and may be adjusted by way of translating to optimize and/or optical system 10 for different or varying spatial frequencies. Each of the optical path length setting mechanisms 40 and 44 may include linear actuators 41 and 45, respectively, structured to vary a displacement between the respective mirror elements and the beam splitter 36, or otherwise vary the displacement between the respective mirror elements and the common detector 20. Linear actuators 41 and 45 may include electrical linear actuators, screw drive actuators, or still another type of actuator or adjustment mechanism, and may be controllably coupled with the electronic control unit 34 so that the mirror elements 54, 56, 58, and 60 may be electronically controlled. The respective mirror elements 54, 56, 58, and 60 may be or include fold mirrors in various examples. The respective mirror elements 54, 56, 58, and 60 might also include or be curved mirrors in various examples, that may have actuating mechanisms to vary mirror shape to diversify the optical path lengths amongst the reflected derivative beams 39 and the transmitted derivative beams 43. In various examples, such adjustable mirrors may be controlled manually and/or electronically using the electronic control unit 34.

In addition, the reflected derivative beams 39 are transmitted from the beam splitter 36 through a polarization element 46 a first time when they are outgoing from beam splitter 36, and a second time when they are incoming to beam splitter 36 after being reflected by the mirror elements 54, 56. The transmitted derivative beams 43 may likewise pass through a polarization element 48 a first time when they are outgoing from the beam splitter 36 and a second time when they are incoming to beam splitter 36 after being reflected by the mirror elements 58, 60.

The polarization elements 46, 48 may be, for example, quarter wave plates (QWPs). A quarter wave plate delays one component of the electromagnetic wave by ninety degrees. Thus, when a derivative beam passes through one of the polarization elements 46, 48 two times as shown in FIG. 2, the resulting derivative beam directed back into the beam splitter 36 will have an orthogonal polarization to when it was originally output by the beam splitter 36. Thus, any derivative beams that originally were transmitted through the beam splitter 36 will be reflected by the beam splitter 36 upon entering the beam splitter 36 a second time. Similarly, any derivative beams that originally were reflected by the beam splitter will be transmitted through the beam splitter 36 upon entering the beam splitter 36 a second time. Thus, the double pass through polarization elements 46 and 48 causes the light that initially passed through beam splitter 36 to be subsequently reflected, and light that initially was reflected subsequently allowed to pass so that each of the derivative beams may be directed to the detector 20.

Figure 6:
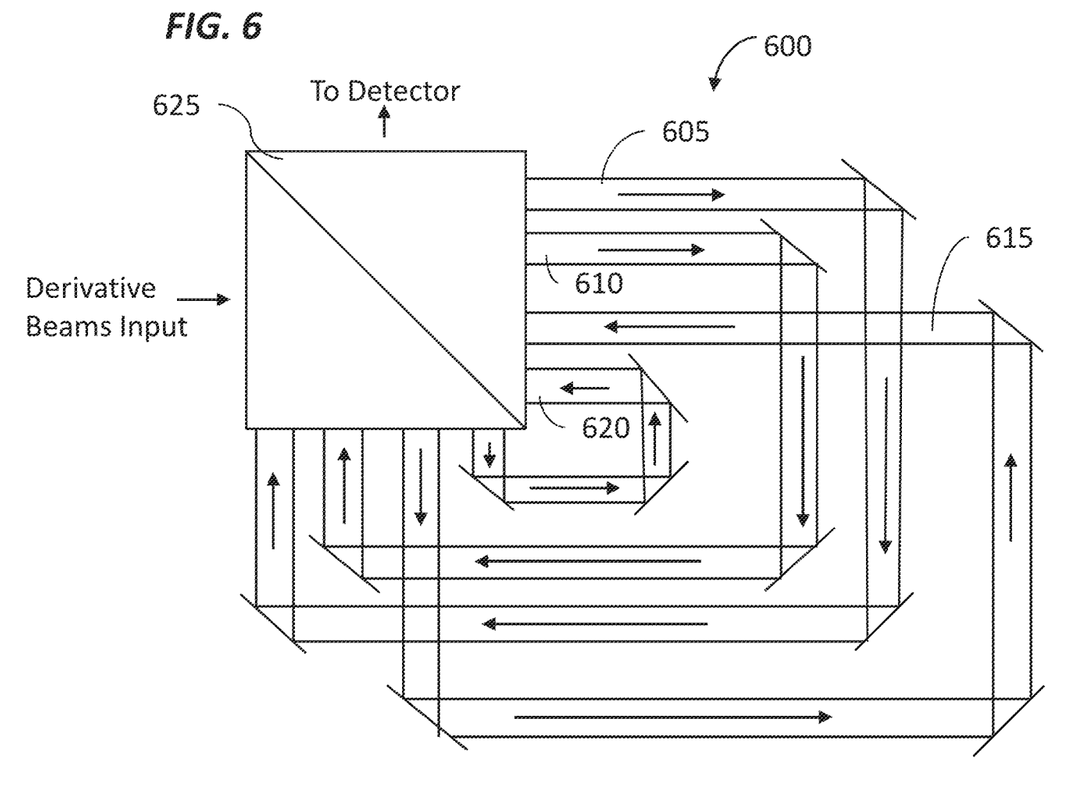
FIG. 6 is a schematic diagram of a portion of an example wave front sensor according to various examples.

Alternative strategies for separating the light into distinct beams and collecting the signals may also be used in various examples as compared to the optical system 10 of FIG. 2. Initially transmitted beams at the beam splitter 36 may be redirected using fold mirrors, for example, to transmit through the other side of the beam splitter 36 without the use of one or both of polarization elements 46 and 48. In other words, designs where first optical formatting arm 38, for example, rather than being structured for receiving outgoing derivative beams 39 and then reflecting the light as incoming beams back to the same side of beam splitter 36, may redirect the beams once varied in optical path length through the other side of beam splitter 36. Second optical formatting arm 42 may be analogously designed to redirect beams through another side of beam splitter 36 than the side from which transmitted beams 43 are received. FIG. 6 shows one such example system 600.

In particular, the system 600 includes a beam splitter 625, which may be similar to or the same as the beam splitter 36 of FIG. 2. Like the beam splitter 36 of FIG. 2, the beam splitter 625 may be configured to reflect light of a certain characteristic (e.g., polarity) and allow a varying characteristic (e.g., orthogonal polarity) pass through. In FIG. 6, beams 615 and 620 are initially reflected out of the beam splitter 625, and then directed back into the beam splitter 625 by fold mirrors onto another side of the beam splitter 625. In this way, the beam splitter 625 may again reflect light associated with the beams 615 and 620 toward a detector.

Similarly, beams 605 and 610 may originally pass through the beam splitter 625, and then the beams 605 and 610 are reflected off of various fold mirrors back into a different side of the beam splitter 625. In this way, the light associated with the beams 605 and 610 may be directed back into the beam splitter 625 to pass back through the beam splitter 625 to a detector. As shown in FIG. 6, different path lengths for each of the beams 605, 610, 615, and 620 may still be achieved in this configuration, though requires moving multiple mirror elements. In various embodiments, additional or alternative components may be used than the fold mirrors shown to direct beams from one side of the beam splitter 625 to another.

Where first polarization element 46 and second polarization element 48 are used, each might include a QWP. In alternative examples, a Faraday rotator or the like might be used. Optical encoders or the like may also be used for metrology to accurately determine locations of mirror elements 54, 56 and 58, 60. As suggested above, the adjustability of the respective mirror elements allows optical system 10 the possibility of compensating for dynamic changes and optimization of spatial frequencies for which optical system 10 is most sensitive. Additional optics, such as lenses or mirrors, may also be used to speed up or slow down the optical beams to control the overall footprint of optical system 10. In one alternative example, sets of "D" mirrors may be used to fit into confined space and reflect individual beams back to beam splitter 36 without occulting neighboring beams.

Figure 3:
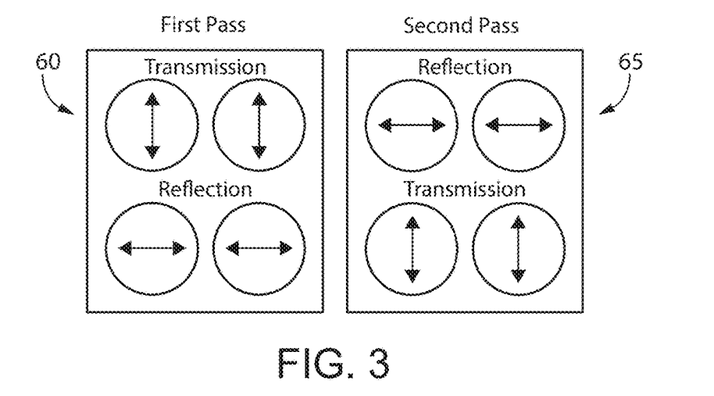
FIG. 3 is a diagrammatic view of incident polarization states and return polarization states of derivative beams interacting with a polarizing beam splitter according to various examples.

Referring to FIG. 3, there is shown a first example graphic 60 representing incident polarization state and a second graphic 65 representing return polarization state of the beams derived from the incident beam 18 of FIG. 2 as they interact with the beam splitter 36. The top two beams of a first polarization are initially transmitted through beam splitter 36 at a first time in the graphic 60, but then are reflected by the beam splitter 36 at a second time in the graphic 65. Similarly, the bottom two beams are initially reflected by the beam splitter 36 in the graph 60 at the first time and then are transmitted by the beam splitter 36 at a second time in the graphic 65. A net rotation of the polarization state of 90°, resulting from a double pass through polarization elements 46 or 48 when using a QWP, allows for all four beams on passing through the beam splitter 36 at the second time (e.g., the graphic 65) to have an orthogonal polarization as compared to the first time they pass through the beam splitter 36 (e.g., the graphic 60). Thus, the beam splitter 36 may simultaneously direct each of the beams with high overall throughput onto the common detector 20 when the beams are directed through the beam splitter 36 for the second time. In addition, as demonstrated in the graphics 60 and 65, each of the beams may be spatially displaced when passing through the beam splitter 36 both the first and second times. Advantageously, this provides for also directing the beams onto the common detector 20 in a spatially displaced manner so that each beam may be imaged without overlapping the images or other interference, etc.

However, in various embodiments, the beams may not be spatially displaced. As just one example, instead of spatially displacing the beams entirely, the beams may be arranged to partially overlap allowing for interference between derivative beams to occur at the common detector. In this case, diversity may still be achieved through changing the path length by adjusting the position of the reflective mirrors in each arm. Those of ordinary skill in the art will appreciate that there are other various methods within the scope of this disclosure that may be used to interpret overlapping or non-overlapping derivative beam signals.

In yet another embodiment, an amplitude beam-splitter may be used in lieu of a polarizing beam-splitter. In such cases, the individual derivative beams are displaced from one another, yet interference is enabled in each of the multiple defocused images reaching the common detector. Those of ordinary skill in the art will appreciate that there are other various methods within the scope of this disclosure that may be used to interpret multiple overlapping and interfering derivative beam signals.

In yet another embodiment, the polarizing beam-splitter and polarization element in each derivative beam are optimized to handle more broadband signals. Non-monochromatic, polychromatic, or semi-polychromatic light may be passed through the wavefront sensing system with minimal losses or attenuation to achieve similar objectives as described in the alternative optical methods and systems, including overlapping, partially overlapping, and interfering and non-interfering arrangements. In such embodiments, diversity of the various beams may be further tuned, refined, calibrated, and characterized by changing the wavelength or wavelengths of light permitted to enter the sensor.

Referring to FIG. 4, there is shown a plurality of defocused, uncompensated beam images 80, 85, 90, and 95. In FIG. 4, the image 80 includes an intensity location 81, and image 85 includes an intensity location 86. The electronic control unit 34 may analyze intensity information for locations 81 and 86, and determine an error based upon that analysis. Wave front reconstruction algorithms may be used to determine the error based on sensed parameters of the beam images. While the images 90 and 95 analogously show different intensities at intensity locations 91 and 96 as an example, the electronic control unit 34 compares intensity information for the example image intensity locations and all the other locations within the images as well. The analysis performed by the electronic control unit 34 may then be used to produce compensated image 23, which may be displayed on display 22. In various examples, the electronic control unit 34 may determine error values that may include a plurality of numerical error terms corresponding to the different image intensity locations analyzed, which are then used in reconstructing phase and amplitude in compensation for aberrations in a wave front. Known wave front reconstruction algorithms may use the analyzed intensities and physics of near-field diffraction to estimate amplitude and phase of the beam at the location of the pupil, or potentially elsewhere in optical system 10. Various wave form and wave front reconstruction algorithms may be used. For example, a Gerchberg-Saxton, modified Gerchberg-Saxton, or other types of algorithm may be used. The estimates of phase and amplitude in turn govern instructions sent to optical correction devices, including electronic control unit 34, for example.

Intensity measurements may have an arbitrary number as noted above, as may a number of the various sampling planes. Intensity measurements at the various sampling planes are self-consistently folded into the analysis for production of a compensated image using hardware as well as numerical methods, for example. A variety of techniques for calculating phase and amplitude of light based upon intensity measurements may be used, and various different locations and arrangement of the various optical elements in optical system 10, including mirror elements 54, 56 and 58, 60, may be used.

Figure 5:
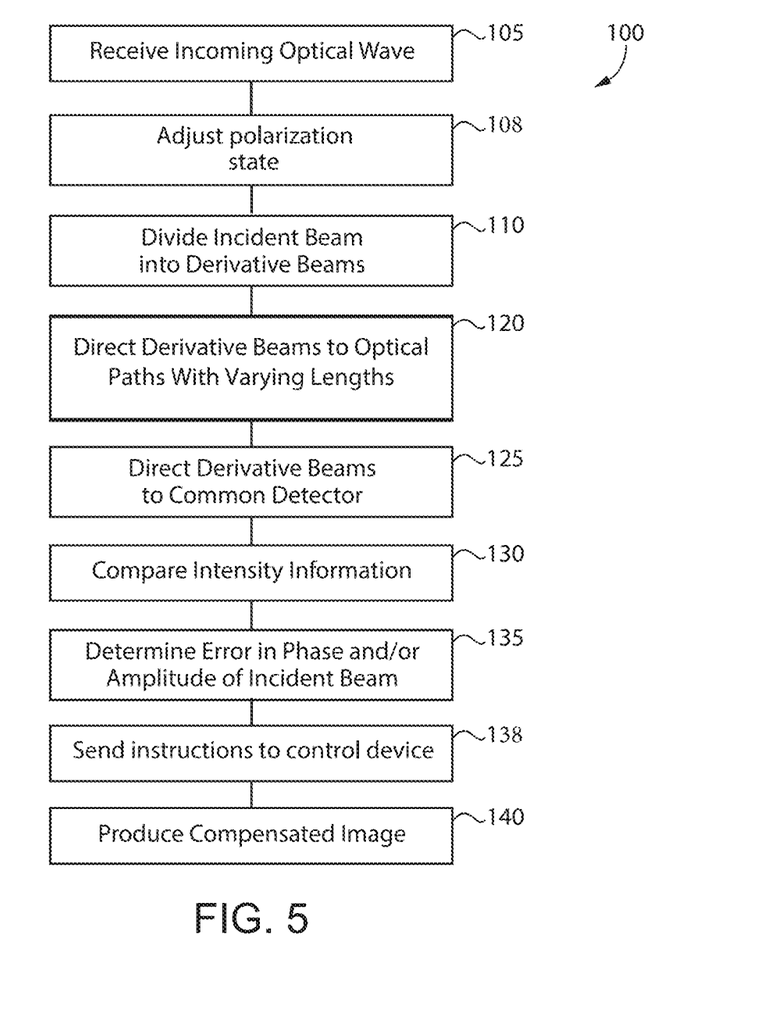
FIG. 5 is a flowchart illustrating an example method of determining wave-front aberrations using a wave front sensor according to various examples.

Referring to FIG. 5, an example method 100 for using a wave front sensor as disclosed herein is shown. The elements of method 100 may also represent one or more aspects of a control logic flow for controlling any of the various wave front sensors disclosed herein. The method 100 of FIG. 5 may be used, for example along with the optical system 10 of FIG. 2. The method 100 includes a block 105 where an incoming optical wave is received. Such an incoming optical wave may be, for example, the incoming optical wave 16 of FIG. 2.

At a block 108, polarization state(s) of the incident and/or derivative beams is adjusted. In various embodiments, the incident beam may be conditioned to have a particular polarization before the incident beam is divided. For example, a polarization element 19 of FIG. may be used. Additionally or alternatively, the polarization of the derivative beams may be adjusted. In the example of FIG. 2, the components that split the incident beam into multiple derivative beams may further adjust the polarity of one or more of the derivative beams (e.g., may cause an output beam to have a particular polarity, such as an orthogonal polarity to another derivative beam). Such adjustments also control the energy in each derivative beam.

The method 100 further includes a block 110 for dividing the incident beam into derivative beams. The derivative beams may be, for example, the derivative beams 30 of FIG. 2. Accordingly, components that divide a beam may be used to implement, at least in part, both of the blocks 108 and 110 of the method 100.

The method further includes a block 120 for directing the derivative beams to optical paths of varying length. For example, the optical paths may be varied by mirrors positioned at different locations for reflecting the derivative beams to have different optical lengths (e.g., as demonstrated in FIG. 2). In various examples, such mirrors or other components for causing different optical paths to have different lengths may be adjustable, so that the different optical path lengths may also be varied as desired.

The method 100 further includes a block 125 for directing the derivative beams to a common detector, such as the common detector 20 of FIG. 2. The method 100 further includes a block 130, where intensity information is compared between the derivative beams as disclosed herein. The method 100 further includes a block 135 for determining an error in phase, amplitude, and/or other characteristic of an incident beam as described herein.

That error determined may then be used at block 138 to control another aspect of an optical system to compensate for any aberrations/errors detected using a wave front sensor of the present disclosure. For example, electronic instructions may be sent to a controllable aspect such as a deformable mirror that introduces a compensation for detected aberrations into the incident beam of a system so that a more accurate image may be generated from the incident beam. The method 100 further includes a block 140 for producing a compensated image based on the determined error as disclosed herein.

Figure 7:
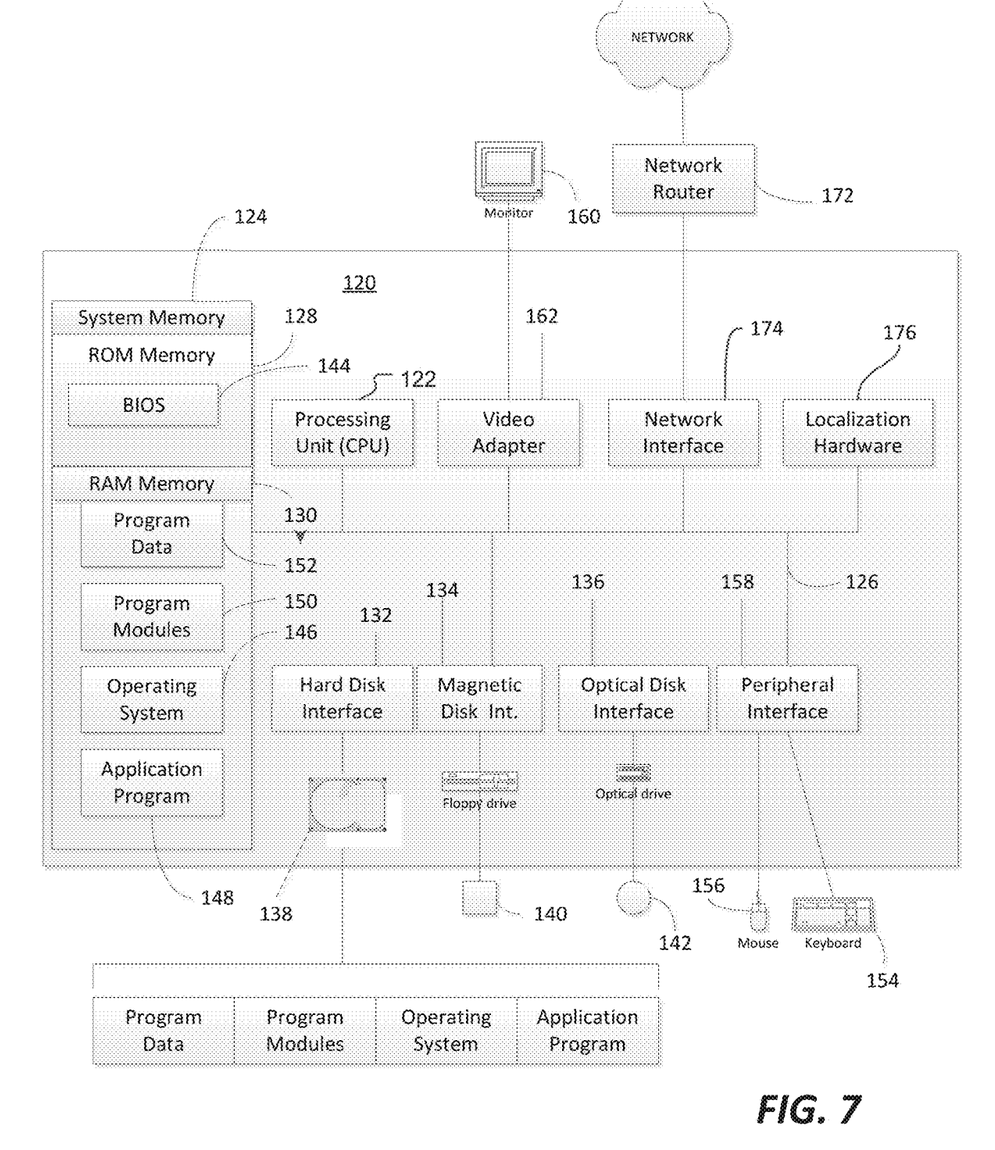
FIG. 7 is a diagrammatic view of an example computing environment, according to various examples.

FIG. 7 is a diagrammatic view of an illustrative computing system that includes a general purpose computing system environment 120, such as a desktop computer, laptop, smartphone, tablet, or any other such device having the ability to execute instructions, such as those stored within a non-transient, computer-readable medium. Furthermore, while disclosed and illustrated in the context of a single computing system 120, those of ordinary skill in the art will also appreciate that the various tasks disclosed hereinafter may be practiced in a distributed environment having multiple computing systems 120 linked via a local or wide-area network in which the executable instructions may be associated with and/or executed by one or more of multiple computing systems 120.

In its most basic configuration, computing system environment 120 typically includes at least one processing unit 122 and at least one memory 124, which may be linked via a bus 126. The processing unit 122 may be a real time or near real time processing unit (e.g., FPGA, GPU, etc.). Depending on the exact configuration and type of computing system environment, memory 124 may be volatile (such as RAM 130), non-volatile (such as ROM 128, flash memory, etc.) or some combination of the two. Computing system environment 120 may have additional features and/or functionality. For example, computing system environment 120 may also include additional storage (removable and/or non-removable) including, but not limited to, magnetic or optical disks, tape drives and/or flash drives. Such additional memory devices may be made accessible to the computing system environment 120 by means of, for example, a hard disk drive interface 132, a magnetic disk drive interface 134, and/or an optical disk drive interface 136. As will be understood, these devices, which would be linked to the system bus 126, respectively, allow for reading from and writing to a hard disk 138, reading from or writing to a removable magnetic disk 140, and/or for reading from or writing to a removable optical disk 142, such as a CD/DVD ROM or other optical media. The drive interfaces and their associated computer-readable media allow for the nonvolatile storage of computer readable instructions, data structures, program modules and other data for the computing system environment 120. Those of ordinary skill in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 120.

A number of program modules may be stored in one or more of the memory/media devices. For example, a basic input/output system (BIOS) 144, containing the basic routines that help to transfer information between elements within the computing system environment 120, such as during start-up, may be stored in ROM 128. Similarly, RAM 130, hard drive 138, and/or peripheral memory devices may be used to store computer executable instructions comprising an operating system 146, one or more applications programs 148 (such as a Web browser, mobile app, and/or other applications that execute the methods and processes of this disclosure), other program modules 150, and/or program data 152. Still further, computer-executable instructions may be downloaded to the computing environment 120 as needed, for example, via a network connection.

An end-user, e.g. a customer or the like, may enter commands and information into the computing system environment 120 through input devices such as a keyboard 154 and/or a pointing device 156. While not illustrated, other input devices may include a microphone, a joystick, a game pad, a scanner, etc. These and other input devices would typically be connected to the processing unit 122 by means of a peripheral interface 158 which, in turn, would be coupled to bus 126. Input devices may be directly or indirectly connected to processor 122 via interfaces such as, for example, a parallel port, game port, firewire, or a universal serial bus (USB). To view information from the computing system environment 120, a monitor 160 or other type of display device may also be connected to bus 26 via an interface, such as via video adapter 162. In addition to the monitor 160, the computing system environment 120 may also include other peripheral output devices, not shown, such as speakers and printers.

The computing system environment 120 may also utilize logical connections to one or more computing system environments. Communications between the computing system environment 120 and the remote computing system environment may be exchanged via a further processing device, such a network router 172, that is responsible for network routing. Communications with the network router 172 may be performed via a network interface component 174. Thus, within such a networked environment, e.g., the Internet, World Wide Web, LAN, or other like type of wired or wireless network, it will be appreciated that program modules depicted relative to the computing system environment 120, or portions thereof, may be stored in the memory storage device(s) of the computing system environment 120.

The computing system environment 120 may also include localization hardware 176 for determining a location of the computing system environment 120. In examples, the localization hardware 176 may include, for example only, a GPS antenna, an RFID chip or reader, a WiFi antenna, or other computing hardware that may be used to capture or transmit signals that may be used to determine the location of the computing system environment 120.

The various examples herein have various advantageous properties. For example, the optical system 10, and others disclosed herein, are inherently sensitive while simultaneously offering a large dynamic range. Usage of the wave nature of light, as opposed to a geometric or ray optics treatment, offers improved sensitivity than that available in certain known designs, such as the Shack-Hartmann design discussed above, for example as high as an order of magnitude or better. It will further be noted that optical system 10 and other examples disclosed herein provide for placement of all defocused pupil images onto the common detector 20 simultaneously and in a spatially displaced manner. This feature may be associated with cost savings, as well as simplified apparatus design and construction (size, weight, power), by requiring the use of only a single detector.

Avoidance of differential timing issues caused by multiple detector components and associated cabling paths may also be reduced by the various examples disclosed herein, as well as ease of alignment by allowing for direct comparison of relative positioning of multiple beams. Also related to simplicity in overall construction, the optical system 10 may include as few as one fold mirror in each optical path of the derivative beams, reducing uncertainty, errors, or throughput loss that may be associated with systems that use greater numbers of fold mirrors.

Translating fold mirrors in each derivative beam optical path, or otherwise varying mirror shape, also provides for dynamic optimization of sensitivity to a given range of spatial frequencies. Non-common-path aberrations and scattering issues may also be minimized while maintaining throughput using the methods and systems disclosed herein. In other words, the design of the examples herein may be easily tuned for specific uses without introducing errors or moving parts that are used in prior wave front sensors.

Still further advantages over known systems relate to the compact opto-mechanical footprint that is available, including, for example, mirrors having optical power through different radii of curvature to focus or defocus individual beams. Because amplitude and phase of an optical wave may be measured simultaneously, as encoded in the diffraction signature of the beams as they propagate through the optical system 10, an adaptive optics sensing approach while in the presence of scintillation is possible. Corrections for scintillation using multiple compensation devices may include situations involving "deep turbulence," in other words relatively large aberrations over long path lengths or through high airmass. Finally, the optical system 10 may be successfully applied with any incoming polarization state, and may likewise work with unpolarized light as discussed above.

The methods and systems herein may also be useful for beam propagation, beam control, communications, remote sensing, adaptive optics, microscopy, astronomy, defense, medical, and any other related applications. In particular, the wave front sensors disclosed herein provide solutions that may be, for example, many times more sensitive than a Shack-Hartmann sensor. This added sensitivity enables, for example, measurements performed over greater distances, of fainter objects, and/or in the presence of greater turbulence as compared to existing wave front sensors. In communications for example, adaptive optics systems that employ the disclosed device may achieve improved error correction, allowing signals to retain more information, reduce power required for remote communications (e.g., laser power), increase throughput and bandwidth of such communications, reduce signal latency, more easily align transmitters and receivers, etc. In medical applications, the increased sensitivity may, for example, allow a sensing instrument to take images that have higher resolution and/or use less light than was previously possible. Sensing in astronomy may further benefit from the increased sensitivity of the methods and systems described herein. For example, fainter objects or artificial guide stars may be sensed, or better resolution images may be generated. Improved sensitivity may also be used to improve tracking of objects, such as objects in near-Earth orbit and space (e.g., satellites).

The systems and methods herein further provide for sensing that can circumvent the effects of scintillation, or the variations in apparent brightness or position of a distant luminous object viewed through a medium (e.g., apparent twinkling of stars). Because a medium can distort images, including scintillation type errors, the wave front sensor described herein may compensate for those distortions to give a more accurate image of the object.

The wave front sensors disclosed herein may also advantageously correct images that pass through greater turbulence than prior sensors could image. For example, if light from space passes through a portion of the atmosphere that has particularly bad weather, the strength of the turbulence may result in other sensors being unable to faithfully sense the phase of light entering an optical system from the atmosphere. In contrast, the methods and systems disclosed herein may provide properly sensed and compensated images in the presence of much greater turbulence in a medium through which the light passes.

Thus, systems and methods disclosed herein may also advantageously be used to track, study, and otherwise image objects that require a high level of sensitivity. In addition, objects that could already be detected by previous sensors may now be detected with greater resolution or shorter integrations. These, and other advantages of the disclosed embodiments, will be appreciated by those of skill in the relevant art as compared to prior wave front sensors.

While this disclosure has disclosed certain examples, it will be understood that the claims are not intended to be limited to these examples except as explicitly recited in the claims. On the contrary, the present disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed examples. However, it will be obvious to one of ordinary skill in the art that systems and methods consistent with this disclosure may be practiced without these specific details. In other instances, well known methods, procedures, components, and circuits have not been disclosed in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those of ordinary skill in the data processing arts to most effectively convey the substance of their work to others of ordinary skill in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various examples of the present invention.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present example, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as disclosed herein or otherwise understood to one of ordinary skill in the art.

What is claimed is:

1. A method of detecting a wave front aberration in an optical system comprising:
   dividing an incident beam of an incoming optical wave into derivative beams having varying polarizations, wherein the dividing of the incident beam comprises passing the incident beam through a first beam displacer and a second beam displacer, such that four derivative beams are output from the second beam displacer, wherein a first and second derivative beams have a polarization orthogonal to that of third and fourth derivative beams;
   directing the derivative beams to optical paths with varied optical path lengths, such that each of the optical path lengths corresponds to a different sampling plane along a direction of propagation of the incident beam;
   directing the derivative beams to a common detector; and
   generating images of the derivative beams by the common detector.

2. The method of claim 1, further comprising
   determining phase and amplitude of the incident beam based on intensities of the images of the derivative beams.

3. The method of claim 1, wherein the dividing of the incident beam into the derivative beams further comprises spatially displacing the derivative beams from one another.

4. The method of claim 1, wherein the dividing of the incident beam further comprises conditioning the derivative beams such that a first derivative beam has a polarization orthogonal to that of a second derivative beam.

5. The method of claim 4, further comprising directing the first and second derivative beams into a polarizing beam splitter (PBS), such that the first derivative beam is transmitted by the PBS and the second derivative beam is reflected by the PBS.

6. The method of claim 5, further comprising, after directing the first and second derivative beams into the PBS, reflecting the first derivative beam off of a first translatable mirror and reflecting the second derivative beam off of a second translatable mirror, wherein the first and second translatable mirrors are configurable for controlling of the optical path lengths of the first and second derivative beams.

7. The method of claim 6, further comprising tuning the optical system to a range of spatial frequencies at least in part by varying a curvature of one of the first or second translatable mirrors or a location of one of the first or second translatable mirrors relative to the common detector.

8. The method of claim 5, further comprising, after directing the first and second derivative beams into the PBS, directing the first derivative beam through a first quarter wave plate (QWP) or Faraday rotator and directing the second derivative beam through a second QWP or Faraday rotator to alter the polarization of the first and second derivative beams.

9. The method of claim 5, further comprising, after directing the first and second derivative beams into the PBS, directing the first and second derivative beams back into the PBS such that the first derivative beam is reflected by the PBS and the second derivative beam is transmitted by the PBS.

10. The method of claim 1, wherein the derivative beams are directed to the common detector simultaneously.

11. The method of claim 1, wherein the derivative beams are spatially displaced from one another when directed to the common detector.

12. An optical system comprising:
an incident beam divider structured to divide an incident beam into derivative beams having varying polarizations, wherein the incident beam divider comprises one or more beam displacers, wherein each of the one or more beam displacers is configured to duplicate an input beam into two output beams, the two output beams having orthogonal polarization with respect to one another;
a beam splitter structured to reflect a first derivative beam of the derivative beams into a first optical path and transmit a second derivative beam of the derivative beams into a second optical path, the first optical path having a different path length than the second optical path;
a first mirror structured to reflect the first derivative beam back to the beam splitter, whereupon the beam splitter is further structured to transmit the first derivative beam to a common detector; and
a second mirror structured to reflect the second derivative beam back to the beam splitter, whereupon the beam splitter is further structured to reflect the second derivative beam to the common detector.

13. The optical system of claim 12, wherein the first and second mirrors are translatable to vary lengths of the first and second optical paths.

14. The optical system of claim 12, wherein the beam splitter comprises a polarizing beam splitter (PBS).

15. The optical system of claim 12, further comprising:
a first polarization element arranged in the first optical path between the beam splitter and the first mirror, wherein the first polarization element is structured to adjust the polarization of the first derivative beam; and
a second polarization element arranged in the second optical path between the beam splitter and the second mirror, wherein the second polarization element is structured to adjust the polarization of the second derivative beam.

16. The optical system of claim 12, wherein the one or more beam displacers comprises two beam displacers such that the incident beam divider outputs four derivative beams, the first derivative beam and a third derivative beam are reflected by the beam splitter into the first optical path, and the second derivative beam and a fourth derivative are transmitted into the second optical path.

17. The optical system of claim 16, wherein each of the four derivative beams are spatially displaced when directed to the common detector and wherein each of the four derivative beams are directed to the common detector simultaneously.

18. The optical system of claim 16, wherein the beam splitter is structured to direct the third derivative beam to a third optical path and the fourth derivative beam to a fourth optical path, wherein the optical system further comprises:
a third mirror structured to reflect the third derivative beam back to the beam splitter, whereupon the beam splitter is further structured to transmit the third derivative beam to the common detector; and
a fourth mirror structured to reflect the fourth derivative beam back to the beam splitter, whereupon the beam splitter is further structured to reflect the fourth derivative beam to the common detector.

19. The optical system of claim 18, wherein each of the first, second, third, and fourth mirrors are structured such that at least one of a mirror curvature or a mirror position is adjustable.

20. The optical system of claim 12, further comprising a controller configured to correct an image derived from an incoming optical wave related to the incident beam based on a comparison of images of the derivative beams generated by the common detector.

* * * * *